Aug. 12, 1947. G. HAIM ET AL 2,425,528
TERMINAL JOINT FOR ELECTRIC CABLE WITH PLASTIC SHEATH
Filed Feb. 13, 1945 2 Sheets-Sheet 1
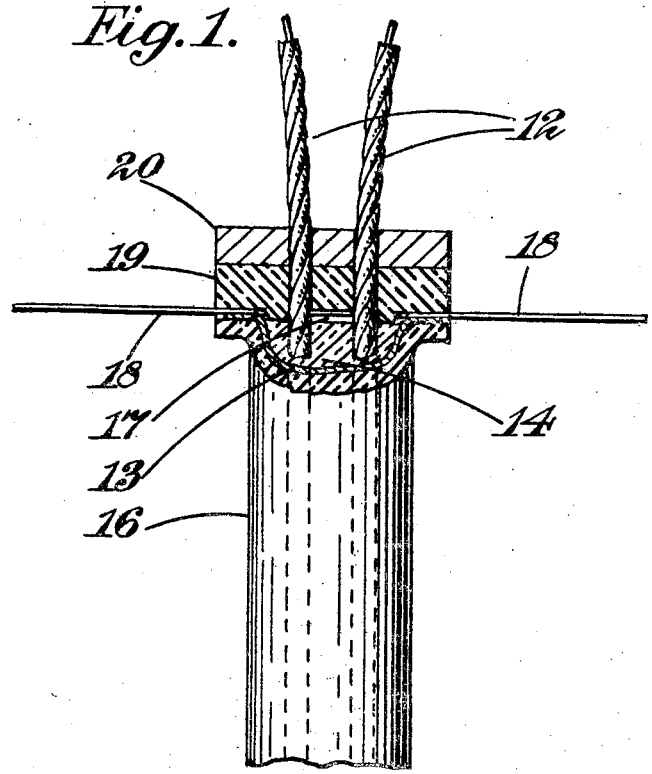
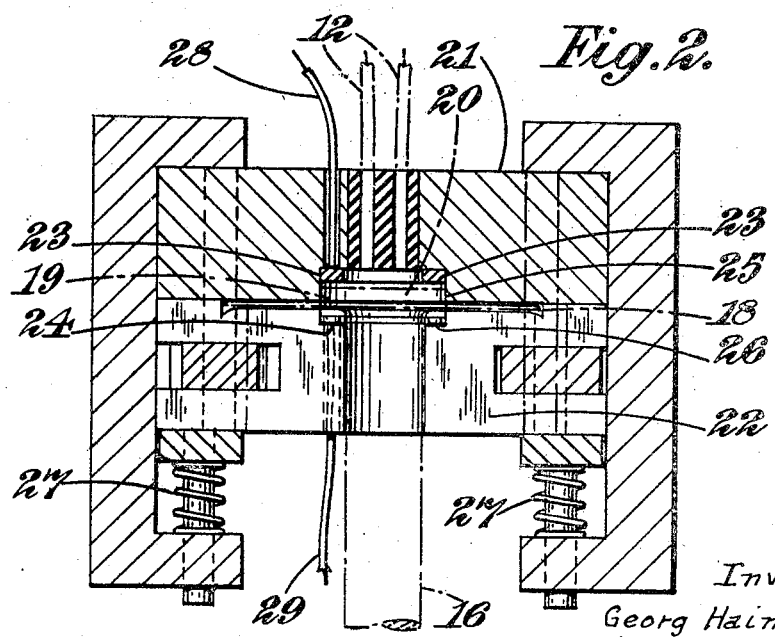
Inventors,
Georg Haim and
Hans P. Zade
By Young, Emery & Thompson
Attys.

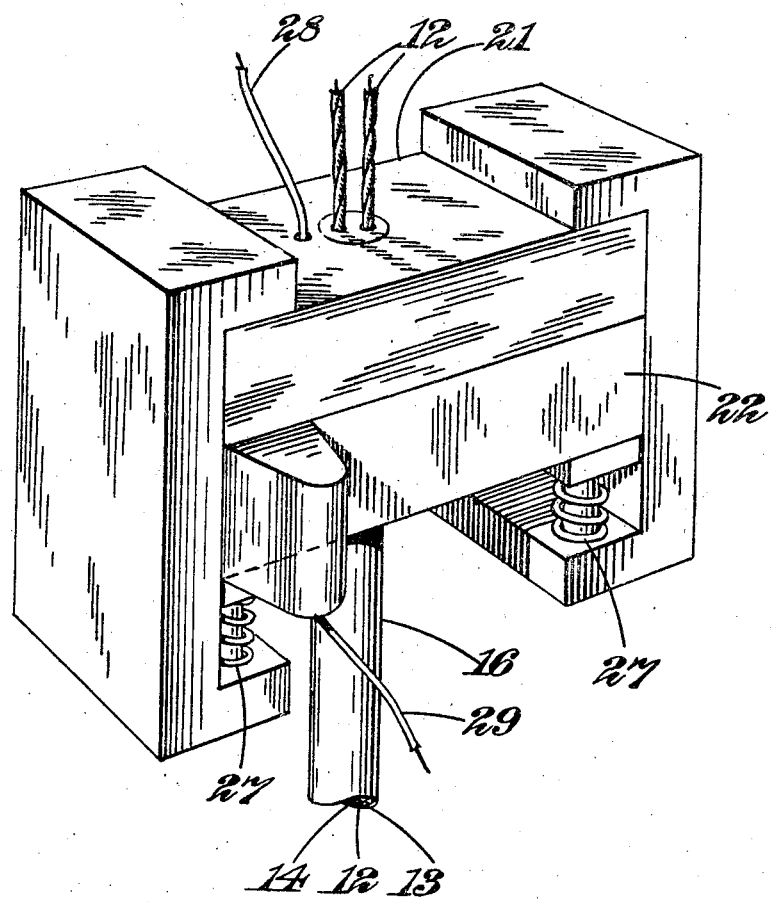

Patented Aug. 12, 1947

2,425,528

UNITED STATES PATENT OFFICE 2,425,528

TERMINAL JOINT FOR ELECTRIC CABLE WITH PLASTIC SHEATH

Georg Haim and Hans Peter Zade, London, England, assignors to Arc Manufacturing Company Limited, London, England, a British company Application February 13, 1945, Serial No. 577,664
In Great Britain June 21, 1943

6 Claims. (Cl. 154—2.23)

This invention consists of terminal joints for an electric cable provided with a plastic sheath.

In British patent specification No. 559,014 methods and apparatus are described for making a terminal joint for an electric cable in which the conductors (generally in the form of stranded wires) are embedded in insulating material made of plastic (such as a poly-olefine plastic) which material is surrounded by a metallic sheath say of braided copper wire sometimes surrounded by a braided cotton sheath and the outer sheath of the cable is made of a plastic such as a polyvinyl ester. When the end of such a cable has to be connected up to electrical apparatus it is necessary, on the one hand, that the electric conductors (the stranded wires) shall be bared, and, on the other hand, that the ends of the insulating material and sheaths shall be sealed in a fluid-tight manner.

In United States specification Serial No. 458,338 there is described a method of consolidating joining faces of thermoplastic material (say to weld pieces of plastic together) which consists in placing together the joining faces of the plastic and, by the employment of conducting electrodes, setting up an alternating electric field of high frequency at the joining faces so that they are sufficiently softened by heat to enable the consolidation to be effected, and that method is used in the present invention. It is also pointed out in that application that the pieces of plastic may be so held or confined that during the electric treatment physical pressure is set up between the joining faces. Further it is pointed out that in cases in which pieces of plastic are to be caused to embrace or grip a foreign body, the pieces of plastic are brought together on both sides of the foreign body and the electrodes are so arranged that when the plastics are rendered soft by heating induced by the application of an alternating high-frequency electric field the result is to ensure a close grip on said foreign body. It is further pointed out that an air gap may be left in the assembly at a surface or surfaces where heat is to be concentrated so as to concentrate the equi-potentials in or near the air gap and any or all of these features may be utilised in the present invention.

The operation of forming and welding the terminal joint is carried out with the use of an embracing jig which can be readily assembled or dismantled and it is a feature of this invention that the jig not only serves to hold the component parts in their proper relative positions and to determine the external form of the welded parts, but is also so shaped as to confine or embrace the component parts so that the volume included between the parts of the jig ensures that the plastic materials and other component parts are (during the heating) subjected to such pressure that any interstices are filled up by the softened plastic.

When an insulated and sheathed cable end of the type above described has been cut away to expose an appropriate length of the conductors and when the sheaths have been flared out radially a washer of thermoplastic insulating material is threaded on to the conductors and is welded to the cable insulation and to the outer sheath of plastic by diathermic welding (preferably in an embracing jig to ensure the fluid-tight seal or joint required.

The washer of thermoplastic material may be a composite washer in two layers, the outer layer being of a comparatively hard or rigid plastic and the inner layer being of a comparatively flexible or deformable plastic and indeed the inner layer may be more readily softened during the diathermic welding stage to ensure a complete penetration and filling of all interstices in the joint and a complete welding to the cable insulation and to the flared sheath of plastic.

It has been found to be difficult to effect a complete seal at the end of the insulating material and the sheaths and special difficulty is experienced in perfecting the seal to the stranded wires.

According to the present invention the roots of the bared wires (i. e. those parts of the bared wires contiguous to the insulating material and to the washers threaded on to the wires) are coated with a liquid or paste of an organic material which is polymerisable at the temperature attained by those parts during the electric heating of the terminal joint.

According to a preferred form of this invention the whole method of forming and welding the terminal joint is carried out by using the process and apparatus above described but when the stranded wires have been bared and cleaned, if necessary, and before the sealing washers have been threaded on to the wires, the roots of the wires are coated with a paste or thick liquid of chlorinated rubber, vinyl chloride, methyl methacrylate, styrene or other monomer which polymerizes by heat during the electric treatment so as to form a fluid-tight seal both with the wires and with the washers and other insulating parts.

In the accompanying drawings which illustrate by way of example one arrangement of terminal joint and the apparatus for use in making such joints:

Figure 1 is an elevation, partly in cross-section, and partly broken away, showing the elements of the cable joint, Figure 2 is a transverse section of one form of jig, and Figure 3 is an outside perspective view of this jig.

The cable on which a sealed terminal joint is to be formed has two conductors 12 each consisting of helically-stranded wires. Surrounding the wires 12 and spaced away from them is a braided copper sheath 13 and in the cable the spaces between the wires 12 and also between the wires and the braided copper sheath 13 are filled up with a plastic insulating material 14 such as polyethylene. Immediately surrounding the braided copper sheath there may be a braided cotton sheath (not shown) and the outside sheath 16 of the cable is a somewhat flexible plastic made of polyvinyl chloride, and in this example it is intended that means shall be provided for earthing the braided copper sheath 13 as well as for sealing the end of the cable, leaving the two stranded wire ends 12 exposed for connection to the electrical apparatus. The outside diameter of the cable may be ⅝″ and the diameter of the polyethylene core about ½″. The first operation is to roll back the outer sheath 16 and to flare out the braided copper sheath 13 so as to expose the polyethylene core 14 which is then cut away level with the surface of the flared copper sheath 13 and at this stage the projecting ends of the stranded wires 12 may be cleaned and tinned. The outer sheath 16 that was rolled or turned back is flared outward radially in contact with the flared end of the copper sheath 13. The diameter of the flared outer sheath 16 may be say ¹⁵/₁₆″ and the diameter of the flared metal sheath may be say ¹⁰/₁₆″ so that the flange of polyvinyl chloride projects out beyond the flange of metal. The next step is to coat the roots of the bared wires (i. e. those parts of the bared wires contiguous to the insulating material and to the washers to be threaded on the wires) with a liquid or paste of an organic material which is polymerisable at the temperature attained by those parts during the electric heating of the terminal joint e. g. with chlorinated rubber, vinylchloride, methyl methacrylate or styrene. It is then necessary to thread over the stranded wires an open annular metal yoke 17 having say two radially-projecting arms 18 so that the metal yoke 17 and the inner ends of the arms 18 rest on the braided metal sheath 13, and the outer ends of the arms 18 are to be used for earthing the sheath. There is next threaded over the exposed ends of the stranded wires a composite washer consisting of two annular bodies of plastic 19 and 20. The inner washer 19 is conveniently made of a comparatively soft grade of polyvinyl chloride and the outer washer 20 (which may have been previously welded to the inner washer) consists of a harder grade of polyvinyl chloride or consists of some other rather rigid plastic like polymerised methyl methacrylate. The diameter of the composite washer is the same as the diameter of the flared flange of the outer cable sheath 16 and the composite washer may fit somewhat closely around the projecting wires 12.

Referring to Figures 2 and 3, the jig used for the purpose of welding up the plastics and consolidating the terminal joint may be a fixed jig or it may be a readily portable device. For the purpose of this invention the important parts of the jig are those which embrace the work. This part of the jig is divided into two components 21 and 22 and in this example each of the components contains one of the electrodes 23, 24 used for the electric heating. Both components have circular or cylindrical recesses 25, 26 to embrace the flanges and washers. The two components 21 and 22 are assembled together under the pressure of springs 27 so that continuous and uniform pressure may be exercised on the plastic material even when it becomes soft and yields under pressure. Wire conductors 28 and 29 lead to the electrodes 23, 24.

It is an important feature of this invention that the metal elements in the joint may themselves form electrodes or may be conductively connected to the electrodes in the jig.

In carrying the invention into effect, after the baring and tinning of the wires 12, removal of the insulating core 14 and flaring of the sheaths 13 and 16 has taken place, the metal yoke 17, 18 and the composite washer 19, 20 are threaded over the wires 12 after coating or painting of the wires and the assembly is put into the jig which is then closed and clamped so that the various elements in the assembly are snugly held in the jig. The alternating electric field of high frequency is then applied to the electrodes 23, 24 through the wires 28, 29, the result being to soften the plastics. In the case of the inner layer 19 of the composite washer, the softening is such that the plastic penetrates into all interstices including the helical grooves in the stranded wires and another effect of the softening of the plastics is to ensure complete union between the various joining faces and a close grip on the flared flange of braided metal, and the metal yoke in contact therewith. If it be desired that the exposed ends of the wires 12 shall have short sleeves of plastic embracing their roots, the portion of the jig through which the wires project may be provided with little metal sleeves.

We claim:

1. A method of making a terminal joint on an insulated and sheathed cable in which the conductors are bedded in insulating material made of plastic and in which the cable has an outer sheath of a plastic, which method comprises exposing end portions of the conductors, flaring the sheaths out radially, threading a washer of thermoplastic insulating material onto the conductors, coating those portions of the bared wires contiguous to the insulating material in which the conductors are bedded and to the washer with a fluid organic material which is polymerisable at the temperature attained by those parts during the subsequent electric heating of the terminal joint and welding the washer on to the cable insulation and to the outer sheath of plastic by diathermic welding in an embracing jig.

2. A method of making a terminal joint on an insulated and sheathed cable in which the conductors are bedded in insulating material made of plastic and in which the cable has an outer sheath of a plastic, which method comprises exposing end portions of the conductors, flaring the sheaths out radially, threading a washer of thermoplastic insulating material onto the conductors, coating those portions of the bared wires contiguous to the insulating material in which the conductors are bedded and to the washer with a liquid of an organic material which is polymerisable at the temperature attained by those parts during the subsequent electric heating of the terminal joint and welding the washer onto the cable insulation and to the outer sheath of plastic by diathermic welding in an embracing jig.

3. A method of making a terminal joint on an insulated and sheathed cable in which the conductors are bedded in insulating material made of plastic and in which the cable has an outer sheath of a plastic, which method comprises exposing end portions of the conductors, flaring the sheaths out radially, threading a washer of thermoplastic insulating material onto the conductors, coating those portions of the bared wires contiguous to the insulating material in which the conductors are bedded and to the washer with a paste of an organic material which is polymerisable at the temperature attained by those parts during the subsequent electric heating of the terminal joint and welding the washer on to the cable insulation and to the outer sheath of plastic by diathermic welding in an embracing jig.

4. A method of making a terminal joint on an insulated and sheathed cable in which the conductors are bedded in insulating material made of plastic and in which the cable has an outer sheath of a plastic, which method comprises exposing end portions of the conductors, flaring the sheaths out radially, threading a washer of thermoplastic insulating material onto the conductors, coating those portions of the bared wires contiguous to the insulating material in which the conductors are bedded and to the washer with a monomer of an organic material which is polymerisable at the temperature attained by those parts during the subsequent electric heating of the terminal joint and welding the washer on to the cable insulation and to the outer sheath of plastic by diathermic welding in an embracing jig.

5. A method of making a terminal joint on an insulated and sheathed cable in which the conductors are bedded in insulating material made of plastic and in which the cable has an outer sheath of a plastic, which method comprises exposing end portions of the conductors, flaring the sheaths out radially, threading a washer of thermoplastic insulating material onto the conductors, coating those portions of the bared wires contiguous to the insulating material in which the conductors are bedded and to the washer with a monomer of an organic material which is selected from the group consisting of chlorinated rubber, vinyl chloride, methyl methacrylate and styrene which is polymerisable at the temperature attained by those parts during the subsequent electric heating of the terminal joint and welding the washer on to the cable insulation and to the outer sheath of plastic by diathermic welding in an embracing jig to form a fluid-tight seal both with the wires and with the washer and other insulating parts.

6. A method of making a terminal joint on an insulated and sheathed cable in which the conductors are bedded in insulating material made of plastic and in which the cable has an outer sheath of a plastic, which method comprises exposing end portions of the conductors, flaring the sheaths out radially, threading a washer of thermoplastic insulating material onto the conductors, which washer is composite and consists of two layers, the outer layer being of relatively hard plastic and the inner layer of relatively deformable plastic, coating those portions of the bared wires contiguous to the insulating material in which the conductors are bedded and to the washer with a monomeric organic material which is selected from the group consisting of chlorinated rubber, vinyl chloride, methyl methacrylate and styrene which is polymerisable at the temperature attained by those parts during the subsequent electric heating of the terminal joint and welding the washer on to the cable insulation and to the outer sheath of plastic by diathermic welding in an embracing jig.

GEORG HAIM.
HANS PETER ZADE.

REFERENCES CITED

The following references are of record in the file of this patent:

UNITED STATES PATENTS

| Number | Name | Date |
| --- | --- | --- |
| 2,248,840 | Wilkoff | July 8, 1941 |
| 2,209,894 | Scott et al. | July 30, 1940 |
| 2,310,423 | Gold | Feb. 9, 1943 |
| 2,319,537 | Delmonte | May 18, 1943 |

FOREIGN PATENTS

| Number | Country | Date |
| --- | --- | --- |
| 496,731 | Great Britain | Dec. 5, 1938 |